United States Patent
Mines et al.

(10) Patent No.: US 11,712,821 B2
(45) Date of Patent: Aug. 1, 2023

(54) HEATING APPARATUS, SYSTEM AND METHOD FOR PRODUCING BEVERAGE CAPSULES

(71) Applicant: BIOME BIOPLASTICS LIMITED, Southampton (GB)

(72) Inventors: Paul Robert Mines, Southampton (GB); Stephen William Baskerville, Southampton (GB); Mark Cornell, Southampton (GB)

(73) Assignee: BIOME BIOPLASTICS LIMITED, Southampton (GB)

( * ) Notice: Subject to any disclaimer, the term of this patent is extended or adjusted under 35 U.S.C. 154(b) by 816 days.

(21) Appl. No.: 16/494,708

(22) PCT Filed: Mar. 20, 2018

(86) PCT No.: PCT/GB2018/050717
§ 371 (c)(1),
(2) Date: Sep. 16, 2019

(87) PCT Pub. No.: WO2018/172758
PCT Pub. Date: Sep. 27, 2018

(65) Prior Publication Data
US 2021/0122090 A1    Apr. 29, 2021

(30) Foreign Application Priority Data
Mar. 20, 2017   (GB) ........................ 1704414

(51) Int. Cl.
*B29C 35/02*    (2006.01)
*B29C 35/04*    (2006.01)
(Continued)

(52) U.S. Cl.
CPC .......... *B29C 35/045* (2013.01); *B29B 13/023* (2013.01); *B29C 51/425* (2013.01);
(Continued)

(58) Field of Classification Search
CPC ..... B29C 35/045; B29C 35/007; B29C 35/02; B29C 51/425; B29C 51/445; B29C 43/52;
(Continued)

(56) References Cited

U.S. PATENT DOCUMENTS

| | | | |
|---|---|---|---|
| 3,894,827 A | 7/1975 | Raley et al. | |
| 5,698,322 A | 12/1997 | Tsai et al. | |

(Continued)

FOREIGN PATENT DOCUMENTS

| | | |
|---|---|---|
| DE | 1166451 B | 3/1964 |
| EP | 1304201 A1 | 4/2003 |

(Continued)

OTHER PUBLICATIONS

Bhatia et al., "Compatibility of Biodegradable Poly (lactic acid) (PLA) and Poly (butylene succinate) (PBS) Blends for Packaging Application", Korea-Australia Rheology Journal, 2007, 19(3): 125-131.

(Continued)

*Primary Examiner* — Jeffrey M Wollschlager
*Assistant Examiner* — Xue H Liu
(74) *Attorney, Agent, or Firm* — James S. Keddie; Bozicevic, Field & Francis LLP

(57) ABSTRACT

The present invention related to an apparatus and method for the manufacturing of beverage capsules. The apparatus can preheat the material used to form the beverage material during the manufacturing process. The material and apparatus are particularly suitable for use in producing single serve beverage capsules from biodegradable materials.

19 Claims, 10 Drawing Sheets

(51) Int. Cl.
    *B65B 29/02*     (2006.01)
    *B29B 13/02*     (2006.01)
    *B29C 51/42*     (2006.01)
    *B29C 51/44*     (2006.01)
    *B65B 9/04*     (2006.01)
    *B65B 47/02*     (2006.01)
    *B29K 23/00*     (2006.01)
    *B29K 67/00*     (2006.01)
    *B29L 31/00*     (2006.01)
    *B29C 35/00*     (2006.01)
    *B29C 43/52*     (2006.01)

(52) U.S. Cl.
    CPC ............ *B29C 51/445* (2013.01); *B65B 9/042* (2013.01); *B65B 29/022* (2017.08); *B65B 47/02* (2013.01); *B29C 35/007* (2013.01); *B29C 35/02* (2013.01); *B29C 43/52* (2013.01); *B29C 2035/0283* (2013.01); *B29C 2035/046* (2013.01); *B29K 2023/18* (2013.01); *B29K 2067/046* (2013.01); *B29K 2995/006* (2013.01); *B29L 2031/7174* (2013.01)

(58) Field of Classification Search
    CPC ...... B29C 2035/0283; B29C 2035/046; B29B 13/023; B29K 2995/006
    USPC .......................................................... 425/50
    See application file for complete search history.

(56) References Cited

U.S. PATENT DOCUMENTS

| | | |
|---|---|---|
| 5,985,776 A | 11/1999 | Bertrand et al. |
| 6,072,158 A | 6/2000 | McNally |
| 6,787,493 B1 | 9/2004 | Nagaoka et al. |
| 2008/0057309 A1 | 3/2008 | Liu et al. |
| 2008/0081090 A1 | 4/2008 | Mayr et al. |
| 2010/0048082 A1 | 2/2010 | Topolkaraev et al. |
| 2010/0276826 A1 | 11/2010 | Takahata et al. |
| 2011/0185911 A1 | 8/2011 | Rapparini |
| 2012/0097602 A1 | 4/2012 | Tedford |
| 2014/0127364 A1 | 5/2014 | Fu et al. |
| 2014/0242309 A1 | 8/2014 | Foss et al. |

FOREIGN PATENT DOCUMENTS

| | | |
|---|---|---|
| EP | 1553224 A1 | 7/2005 |
| EP | 1985267 A1 | 10/2008 |
| GB | 1442659 A | 7/1976 |
| JP | H11342078 A | 12/1999 |
| JP | 2012130575 A | 7/2012 |
| JP | 2014218766 A | 11/2014 |
| KR | 101715766 B1 | 3/2017 |
| WO | WO 98/24951 A1 | 6/1998 |
| WO | WO 99/23163 A1 | 5/1999 |
| WO | WO 2009/145778 | 12/2009 |
| WO | WO 2011/077091 A1 | 6/2011 |
| WO | WO 2011/124989 A2 | 10/2011 |
| WO | WO 2012/027539 A2 | 3/2012 |
| WO | WO 2013/157924 A1 | 10/2013 |
| WO | WO 2013/165832 A1 | 11/2013 |
| WO | WO 2013/168083 A1 | 11/2013 |
| WO | WO 2013/189555 A1 | 12/2013 |
| WO | WO 2014/138898 A1 | 9/2014 |
| WO | WO 2015/087798 A1 | 6/2015 |
| WO | WO 2015/128527 A1 | 9/2015 |
| WO | WO 2016/067128 A1 | 5/2016 |
| WO | WO 2017/106191 A1 | 6/2017 |
| WO | WO 2018/070490 A1 | 4/2018 |

OTHER PUBLICATIONS

Biostrength 280, Transparent Impact Modifier, Product Description, Arkema, 2017.

Sheth et al., "Biodegradable Polymer Blends of Poly (lactic acid) and Poly (ethylene glycol)", Journal of Applied Polymer Science, 1997, 66: 1495-1505.

HEATING APPARATUS, SYSTEM AND METHOD FOR PRODUCING BEVERAGE CAPSULES

CROSS-REFERENCE TO RELATED APPLICATIONS

This application is a § 371 national phase of International Application No. PCT/GB2018/050717, filed on Mar. 20, 2018, which claims the benefit of United Kingdom Patent Application No. 1704414.0, filed on Mar. 20, 2017, which applications are incorporated by reference herein.

This invention relates to an apparatus and method for the manufacturing of beverage capsules. In particular the invention relates to an apparatus and method for use in manufacturing single serve beverage capsules from a biodegradable material.

STATE OF THE ART

Single serve beverage capsules, such as coffee capsules or pods, typically comprise a sealed packet containing the desired beverage, i.e. coffee, tea etc. The capsules have a defined interior volume which holds the ingredients, such as ground coffee, tea or other ingredients. One form of capsules has a support ring holding a mesh body in the form of a dome shaped cavity which holds the product, and a lid to close and seal the capsule. The mesh body acts as both support and the filter for the coffee, when brewing the beverage. Typically the mesh body of the capsule is made from non-biodegradable oil based products, for example polyethylene terephthalate (PET), and therefore have a high environmental impact.

Biodegradable and compostable materials, made from a blend of one or more polymers are now available. However current systems and methods to produce beverage capsules are not suitable for manufacturing capsules made from these biodegradable materials. Existing methods to prepare beverage capsules involve shaping a disc of material into a substantially dome shape form to produce the body of the capsule, which is then subsequently filled with the desired product, i.e. coffee grounds.

Where support rings are welded onto a sheet of material during manufacturing of the capsules, the inside area of the rings defines a disc shaped area of material which will be stretched and shaped to form the body of each individual capsule. Heated thermoformers can be used to stretch and shape the sheet of material into the desired shape of the capsule body.

However the heat resistance of biodegradable materials is low and therefore current systems for making coffee capsules are not suitable when using a biodegradable material to form the body of the capsule, in particular due to the high speeds the production apparatus cycle at. The combination of heat and amount of time typically required to shape the body of the capsule would cause the biodegradable material to melt or degrade during the shaping process.

The present invention seeks to provide an apparatus and method that can be used in the production of beverage capsules where the body of the capsules is formed from a biodegradable material, for example those composed of a blend of biodegradable polymers.

The term "biodegradable" as used herein, means degradable by means of microorganisms, such as fungi, bacteria, viruses, algae, etc.; and/or by exposure to enzymatic mechanisms. As applied to a given article, such as a fabric, the requirement "biodegradable" should be understood to be met if the majority of that article is biodegradable, i.e. if the article is "partially" biodegradable. It is not intended that the entire article must be biodegradable. Suitably, at least 60% of the article may be biodegradable, on a weight basis; optionally at least 70%; optionally at least 80%; optionally at least 90%; optionally at least 95%; optionally 100% of the article may be biodegradable. Generally speaking, greater biodegradability is preferred.

The term "compostable" means degradable to form compost. As applied to a given article, such as a fabric, the requirement "compostable" should be understood to be met if the majority of that article is compostable, i.e. if the article is "partially" compostable. It is not intended that the entire article must be compostable. Suitably, at least 60% of the article may be compostable, on a weight basis; optionally at least 70%; optionally at least 80%; optionally at least 90%; optionally at least 95%; optionally 100% of the article may be compostable. Generally speaking, greater compostability is preferred.

SUMMARY OF THE INVENTION

The invention provides apparatuses which can preheat material during the manufacturing of beverage capsules, and are particularly suitable for use in producing single serve beverage capsules from biodegradable materials.

Accordingly, a first aspect of the invention provides a preheating apparatus for use in the preparation of beverage capsules, the beverage capsule comprising a body formed from a sheet of material, the apparatus comprising a housing comprising:

a plurality of spaced apart airflow passages for receiving a supply of heated air, each airflow passage comprising:
an inlet to receive the heated air;
an outlet for discharging the heated air to a defined area on the material which is to form the body of a capsule; and
an airflow disrupter supported within the airflow passage and being configured to disrupt the airflow through the passage to provide a substantially uniform temperature distribution across the outlet, such that the defined area can be substantially uniformly heated.

The uniform temperature distribution across the outlet enables the defined area to be uniformly heated to the desired temperature in use. The configuration to disrupt the airflow may comprise the outlet and/or airflow disruptor being shaped to disrupt the airflow.

It will be appreciated that beverage capsules are mass produced using fast production methods designed to yield many beverage capsules per unit of time. Therefore, the apparatus may be configured to heat the material quickly, such as in the order of about 5 seconds or less; preferably about 4 seconds or less; preferably about 3 seconds or less; preferably about 2 seconds or less; preferably about 1 second or less.

The apparatus provides a substantially uniform heated airflow from each of its outlets to separate defined areas on the sheet of material so the defined areas of material are heated to substantially the same temperature across its region. By "substantially" it is meant there is only up to a 5-10% difference in temperature of the material across each defined region and between individual regions. The apparatus enables a high amount of heat to be applied, in a short space of time to localised areas of the material, without the material melting.

The apparatus is configured to provide an outgoing airflow at the outlet having a temperature in the range of about 75° C. to 170° C., preferably in the range of about 90° C. to 155° C., preferably about 140° C. to 150° C., such that the apparatus can heat the material to a temperature in the range of about 75° C. to 140° C., preferably in the range of about 90° C. to 130° C., preferably about 90° C. to 120° C.

The defined areas are distinct and separate areas on the sheet of material and correspond to the portion of material to be shaped into the body of the capsule. The defined area of the material corresponds to the shape of the material to be formed into the body of the capsule. In one embodiment the defined area can be a substantially circular shaped area of material which is to be formed into the dome or hemispherical shaped body of the capsule. The outlets of the airflow passages will have a corresponding circular cross section. The supporting rings attached to the material can define the area of the material, to which the heat from the airflow passages is focused. The apparatus may be configured to minimise heat directed onto the ring itself (e.g. configured such that the airflow substantially avoids contact with the ring). Although the defined area and corresponding outlet are described as having substantially circular shapes, other polygonal shapes can be provided.

Each airflow passage comprises a first section having the inlet, and an output end leading to a second section having the outlet for discharging the heated air to the material. The second section has a greater diameter than the first section. The flow disrupter can be located in the second section of the airflow passage. The flow disrupter disrupts the airflow received from the first section to cause turbulent airflow in the second section, such that a uniform temperature distribution is provided across the outlet of the airflow passage.

The flow disrupter can comprise a plate coaxially located in the second section of the airflow passage, the plate having a smaller diameter than the outlet of the passage. The plate has a larger diameter than the output end of the first section. The plate is positioned in the second section such that there is a space between the output end of the first section and the top surface of the plate and such the bottom surface of the plate will not contact the material when in use. Preferably the plate is located fully within the second section such that there is a space between the outlet of the passage and the bottom surface of the second plate. Preferably the space between the top of the plate and the output end is about 1-5 mm, preferably about 1-3 mm, preferably about 1-2 mm, preferably about 1.6 mm. Preferably the space between the bottom surface of the plate and the outlet is about 3-6 mm, preferably about 3-5 mm, preferably about 4 mm.

Preferably the ratio of the diameter of the outlet of the airflow passage to the diameter of the plate is in the range of about 4:1 to about 1.5:1, preferably about 3:1 to 2:1, preferably about 2:1. Preferably the ratio of the diameter of the output end of the first section to the diameter of the plate is in the range of about 1:5 to 1:1.5, preferably about 1:3 to 1:2, preferably about 1:2.5.

In one embodiment the flow disrupter further comprises a support member connected to the plate, preferably by a shaft to support the plate in the airflow passage. The support member can be a second plate. The second plate can be attached to the first end of the shaft and the plate to the opposite end of the shaft, wherein the second plate comprises at least two apertures. The apertures can be in the formed of arcuate slots which enable the air to flow through the second plate. The second plate can have a smaller diameter than the first plate and assists in supporting the flow disrupter in the airflow passage. The second plate sits within an enlarged portion of the first section of the airflow passage.

The first plate is a solid plate, such that the airflow received from the first section is directed to the sides of the airflow passage in the second section. The first and second plates can be substantially circular however other plate shapes, such as square, rectangular, oval and other polygonal shapes can be used.

The flow disruptor is preferably formed from a heat-conducting material. Preferably the heat conducting material is brass, however other suitable materials (such as peek, stainless steel, etc.) can be used that withstand the high airflow temperatures which, in use, the airflow disrupter is exposed to.

The apparatus can further comprise airflow barriers disposed about the outlet of the airflow passage to contain the air discharged from the airflow passage. Different forms of airflow barriers can be used, which taken together can preferably provide at least a partially enclosed chamber about the outlet of the passage.

A first form of airflow barriers are side partitions located between adjacent airflow passages, the side partitions extending downwardly from the bottom of the housing. The side partitions extend across the width of the housing and assist in preventing interference between airflows discharged from adjacent airflow passages. Preferably the side partitions are moveable relative to the housing. Preferably the side partitions can be vertically moveable relative to the housing to which they are connected. Moveability enables tolerance of variability in thickness of the material which is to form the body of a capsule.

The side partitions can have top and bottom flanges connected by a wall therein between, to form a substantially I-shaped cross section. T-shaped channels are formed in the bottom surface of the housing between the outlets of adjacent airflow passages. The side partitions are attached to the housing with the top flanges located in the corresponding T-shape channel, such that bottom flange extends below the bottom surface of the housing.

A second form of airflow barrier is an airflow skirt. Elongate airflow skirts can extend along the back of the housing, and/or can extend along the front of the housing. Each of the front and back skirts are attached to the front and back walls of the housing respectively, such that the skirts extend downwardly below the bottom of the housing. Preferably if this second form of airflow barrier is present, only the back skirts extending along the back of the housing is present which, taken to together with two opposing side partitions, form a partially enclosed chamber, having an open front side about the outlet of a passage.

The apparatus can further comprise a plurality of rollers attached to the back of the housing. The rollers rotate about a substantially longitudinal axis. In addition to rotating the rollers can be moveable relative to the housing. Preferably the rollers can move vertically relative to the housing.

The heating apparatus can be attached to an air source, which supplies heated air to the airflow passages.

The apparatus can further comprise a control mechanism to control the flow and temperature of the air to one or more of the airflow passages in the plurality. The control mechanism helps regulate the flow rate and temperature of the heated air provided to the airflow passages. The apparatus can further comprise sensors to monitor the conditions in the airflow passages. Each airflow passage may comprise one or more sensors to measure conditions in the airflow passage such as the incoming air temperature, the outgoing air temperature, and the flow rate. Preferably the sensor measures the temperature of the airflow about the airflow disrupter, to determine the temperature of the air being deployed to the material. A feedback mechanism can be provided to enable the operating conditions of the apparatus to be adjusted to achieve the desired temperature of air being discharged towards the material.

A second aspect of the invention comprises a system for preparing beverage capsules, wherein the beverage capsules comprise a support ring and a body formed from a material sheet for holding a dose of beverage product. The system comprises:
- conveyancing means to move the sheet of material to form the body of the capsule through the system;
- a welding unit to attach at least one support ring to the material, each support ring providing a defined area of the material;
- a preheating unit to heat the material in the at least one defined areas;
- a shaping unit to form the material in the defined areas into the body of the beverage capsules;
- a filling unit to provide the beverage product into the body of the capsules;
- a sealing unit to provide lids to the capsules;
- a shearing unit to cut the material to form separate individual capsules.

The preheating unit and shaping unit are separate units in the system, which operate on the same defined areas of the material at different times.

Preferably the preheating unit is configured to heat the material by providing a hot air stream to each of the defined areas on the material. Preferably the pre-heating unit comprises an apparatus as described above.

The system can also comprise a vacuum unit connected to the conveyancing means to remove excess heat away from the material. The vacuum unit can comprise a vacuum pump configured to supply air suction below the preheater unit to remove excess heat from the material.

A further aspect of the invention provides a method for forming the body of a beverage capsule from a sheet of material, wherein the beverage capsule comprises a support ring and the body for containing a beverage product, the method comprising:
- preheating the sheet of material forming the body of the capsule, in a defined area to provide a heated defined area; and
- shaping the heated defined area of material into the body of the capsule.

The shaping of the material occurs after the material has been heated to the desired temperature.

A further aspect of the invention provides a method for manufacturing a beverage capsule wherein the beverage capsule comprises a support ring and a body for containing a beverage product, the method further comprising:
- providing a sheet of material to form the body of the capsule;
- welding at least one supporting ring to the sheet of material, each support ring providing a defined area on the sheet of material;
- preheating the sheet of material forming the body of the capsule, in the defined area, to provide a heated defined area;
- shaping the material in the heated defined area to form the body of the capsule;
- filling the body of the capsule with the beverage product;
- sealing the capsule with a lid; and
- shearing the material to provide an individual beverage capsule.

The preheating of the material is performed as a separate and distinct step from the shaping of the material into the body of the capsule. The preheating of the material is performed by a first apparatus, preferably at a first location and the shaping of the material is performed by a second apparatus, preferably at a second location.

The method can involve providing a sheet of biodegradable material to form the body of the capsule.

Preheating the defined areas on the material comprises areas on the material comprises heating the defined areas on the material to a temperature above the glass transition temperature of the material and below the melting temperature of the material. The term "glass transition temperature", as applied to a mixed component comprising a polymer (such as a blend, a fabric comprising a blend, etc.), should be understood to denote the relevant transition temperature of the predominant polymer in the blend (i.e. major component on a weight basis). In instances where polymers in a blend are fully dispersible (e.g. miscible) in one another, then the glass transition of the blend may comprise properties combined from each of the polymers.

The temperature that the material should be heated to will depend on the material being used to form the body of the capsule. Preferably heating the defined areas of the material comprises heating the material to a temperature in the range of about 75° C. to 140° C., preferably in the range of about 90° C. to 130° C., preferably about 90° C. to 120° C.

The preheating of the material can be performed by applying heated air to the defined areas. The heated air discharged to the material can have a temperature in the range of about 75° C. to 170° C., preferably in the range of about 90° C. to 155° C., preferably about 140° C. to 150° C. The heated air can be provided at a flow rate of about 3-12 ft$^3$/minute, preferably about 6-9 ft$^3$/minute, preferably about 7-9 ft$^3$/minute, preferably about 8 ft$^3$/minute (0.0038 m$^3$/s) through the airflow passage.

Preferably the preheating of the material is preformed using an apparatus or system as described above.

A further aspect of the invention comprises an apparatus for use in the manufacture of a beverage capsule, the beverage capsule comprising a body formed from a sheet of material. The apparatus comprising a housing and has a single airflow passage connectable to an air supply to provide heated air to the airflow passage, to preheat a defined area on the sheet of material, as described in the apparatus above. An airflow disrupter is supported within the airflow passage and configured to disrupt the airflow through the airflow passage to provide a substantially uniform temperature distribution across the outlet.

The apparatus can further comprise airflow barriers to contain the heated airflow to the desired area. The airflow barriers are disposed about the outlet of the airflow passage, extending down below the bottom surface of the housing. Preferably the airflow barriers are disposed such that the front side of the outlet is open, i.e. there no airflow barrier on the front side of housing extending down the below the bottom surface of the housing.

A plurality of the housings comprising a single airflow passage can be used together to provide a system to preheat multiple defined areas on the sheet of material simultaneously.

Preferably the apparatus and methods of the present invention are for manufacturing beverage capsules wherein at least the body of the beverage capsules are formed from a biodegradable material. The invention is particularly suitable for use in producing capsules made from a biodegradable non-woven fabric comprising a biodegradable polymeric blend.

The term "non-woven fabric" as used herein, means a sheet or web structure bonded together by entangling fibre or filaments (and by perforating films) mechanically, thermally, and/or chemically.

A biodegradable polymeric blend is one or more biodegradable and/or compostable polymers, optionally together with other components. Polylactic acid (i.e., PLA), is a biodegradable polymeric material. In one embodiment the capsules formed by the apparatus and methods of the present invention, comprise a ring formed from a material comprising a polymeric blend of polylactic acid and glass fibre. The material forming the body of the capsule can comprise a polymeric blend of polylactic acid and polybutylene succinate (PBS). The material can be a non-woven fabric comprised of the fibres of the polymeric blend. Both the ring and mesh blends optionally further comprising other components, e.g. plasticisers, dyes, etc. Other biodegradable polymeric blends may also be used to form the biodegradable material which the capsules are produced from. In addition to PLA and PBS, other biodegradable polymers that can used to form the biodegradable fabric include but are not limited to polycaprolactone (PCL) and polyhydroxyalkanoates (PHA).

Biodegradation/composting may take place via a number of pathways, including by hydrolysis and/or oxidation. Microorganisms, such as bacteria, yeasts, fungi and also enzymatic processes also lead to biodegradation. For instance, enzymatic of aliphatic polyesters is known (see Tokiwa, Suzuki Nature 1977, 270, 76 to 78).

As is known for a polymer to be compostable, it must break down under composting conditions. Articles and polymers that conform to the EN13432:2000 or ASTMD6400-12 standards are deemed to be biodegradable and/or compostable. Advantages of biodegradable and/or compostable articles and polymers are that they can have a reduced carbon footprint, be more environmentally friendly and/or less reliant on fossil fuels for their production. It is preferred that the biodegradable material used to form the body and the support rings of the capsule conforms to the EN13432:2000 or ASTMD6400-12 standards.

In the following description, the terms "top" and "bottom", "upper" and "lower" and "back" and "front", etc are used to define relative locations of features of the apparatus. The terms front and back are defined in relation to the direction which sheet of material is moving relative to the apparatus. The front of the heating apparatus faces the next unit to which the material is to be moved to, i.e. the shaping unit. The back of the heating apparatus faces the unit from which the material has been received from, i.e. the welding unit.

FIGURES

Embodiments of the invention will now be described, by way of example only, with reference to the following drawings, in which.

DETAILED DESCRIPTION OF THE INVENTION

The invention provides an apparatus that can be used in the manufacture of beverage capsules, and a system and method to manufacture the beverage capsules. Single serve beverage capsules, also known as beverage pods or cups, can comprise a support ring holding a mesh filter body formed from a sheet of fabric. The shaped mesh filter body of the capsule is in the form of a cavity having a substantially hemispherical or dome shape and contains a serving of ground coffee. A lid is positioned over the top of the support ring to close the capsule and contain the product within the body of the capsule.

The invention is particular suitable for beverage capsules when the material forming the body of the capsule is a biodegradable material. The capsules produced by the methods and apparatus of the invention can also comprise support rings formed from a biodegradable material. The invention is particularly suitable for use in producing capsules made from a biodegradable non-woven fabric comprising a biodegradable polymeric blend.

A preheating apparatus according to the invention can be used in manufacturing beverage capsules formed from a biodegradable non-woven fabric comprising a polymeric blend. The apparatus preheats multiple defined areas of a sheet of biodegradable fabric before the material is shaped to form the body of the beverage capsule. The apparatus directs a stream of hot air to the defined areas, before the material is shaped to form the body of the capsule.

Figure 1:
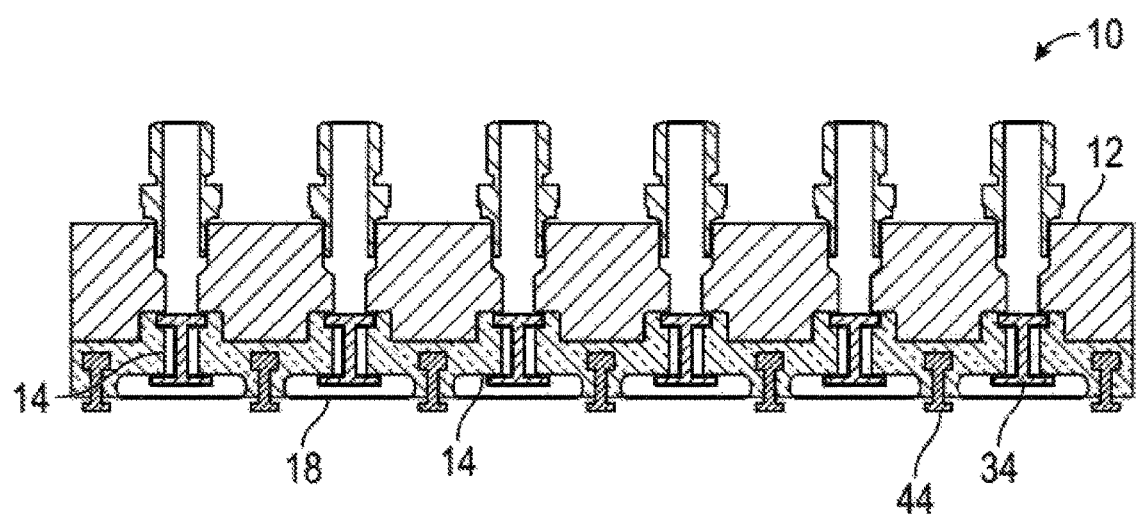
FIGS. 1 and 2 are sectional views of the heating apparatus.
Figure 2:
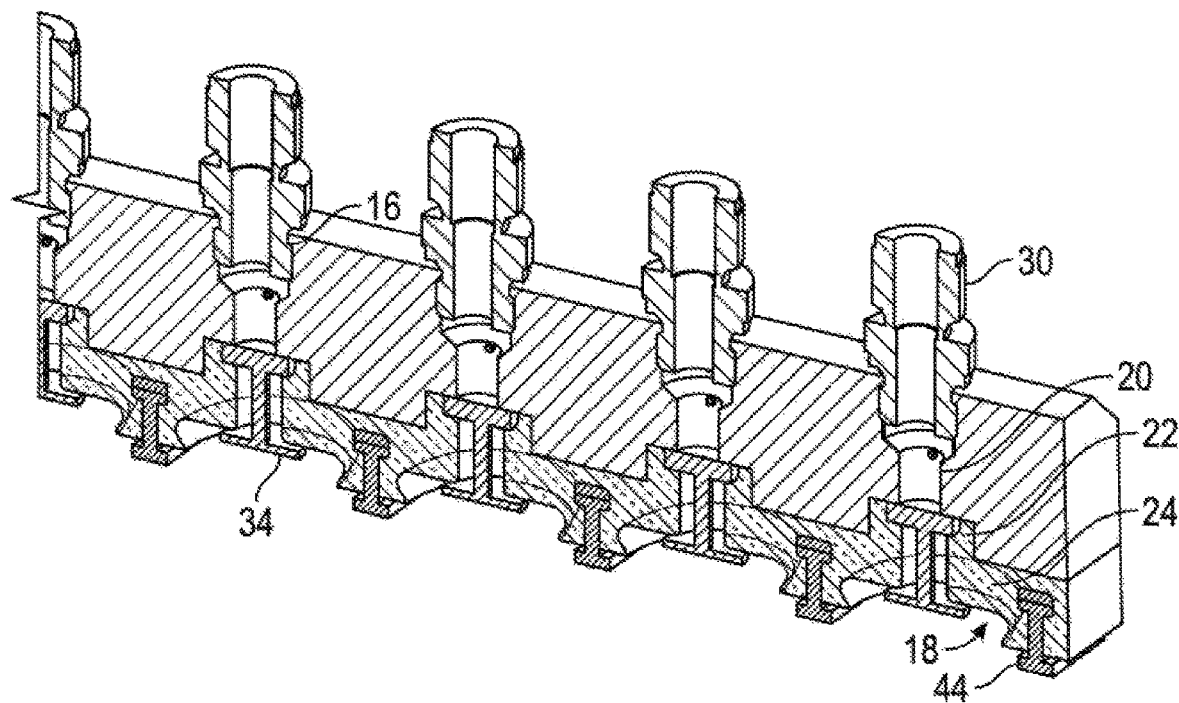

One embodiment of the apparatus of the invention is exemplified in FIGS. 1 and 2. The apparatus 10 for preheating defined areas of a sheet of the non-woven fabric comprises a housing 12 which is connected to an external supply of heated air (not shown). The housing 12 comprises a plurality of airflow passages 14 which can be provided with heated air from an external air supply. The airflow passages are arranged in a spaced apart manner to receive heated air from the external air supply and to discharge the heated air towards the sheet of fabric (not shown).

Each airflow passage 14 comprises an inlet 16 for receiving the heated air, an outlet 18 to discharge the heated air to the sheet of fabric and an airflow disrupter (34) to disrupt the airflow through the airflow passage to provide a substantially uniform temperature distribution across the outlet. Each airflow passage 12 acts as a nozzle to provide heated air to its respective defined area on the fabric and has an outlet having a greater diameter than its inlet.

As shown in FIGS. 1 and 2 the apparatus comprises a housing in the form of an elongate body with six airflow passages formed in a longitudinal array along the length of the body. The apparatus will therefore be able to heat six individual defined areas on the sheet of fabric simultaneously. However other number of airflow passages can be provided in the apparatus, for example the housing can comprise 1, 2, 3, 4 or more airflow passages, preferably four to eight, more preferably six airflow passages. The arrangement and positioning of the airflow passages will vary depending on the system and material the heating apparatus is to be used in. For example the number of airflow passages can vary depending on the width of the fabric with which the capsules are to be made from.

Figure 4:
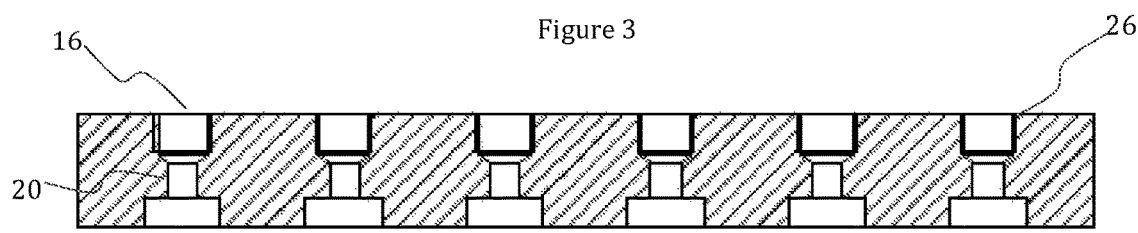
FIG. 4 is a sectional view of a first component of the housing forming the apparatus.
Figure 6:
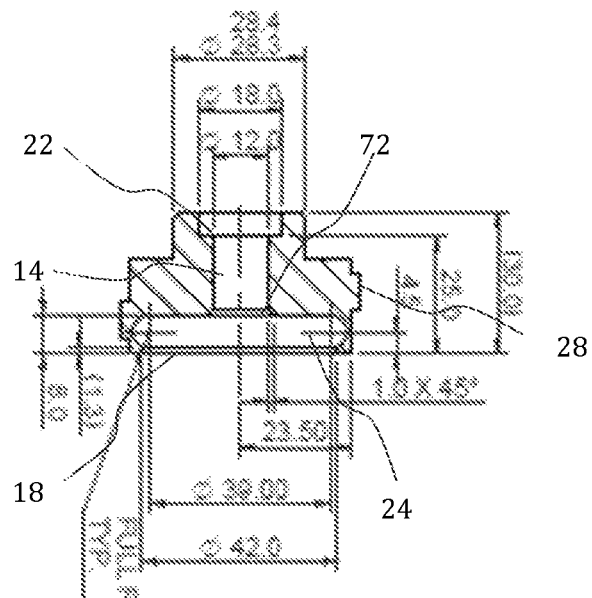
FIG. 6 is a sectional view of the second component of the housing forming the apparatus.

Referring to the FIGS. 2, 4 and 6 each airflow passage is formed from a first upper section 20, and a second lower section 24, each section coaxially aligned with each other. The top opening of the first upper section 20 defines the inlet 16 for the airflow passage 14 and the output end 72 of the first upper section feeds the heated air received from the external air supply into the second lower section 24 of the airflow passage 14. The bottom opening of the lower section 24 defines the outlet 18 of the airflow passage 14. The outlet 18 of the lower section 24 has a greater diameter than the inlet 16 and the output end 72 of the upper section 20, and directs the heated air down towards the fabric.

The airflow passages 14 extend through the housing, with each airflow passage 14 comprising an inlet 16 to individually receive air directly from the external air supply. The inlets of the upper section 20 can comprise air supply connecting members 32 located therein to enable the external air supply to be secured to the apparatus. The upper section 20 has an expanded central portion 22, having a greater diameter than the output end 72 of the upper section. This expanded portion is provided to help support the airflow disrupter in the airflow passage.

Figure 19:
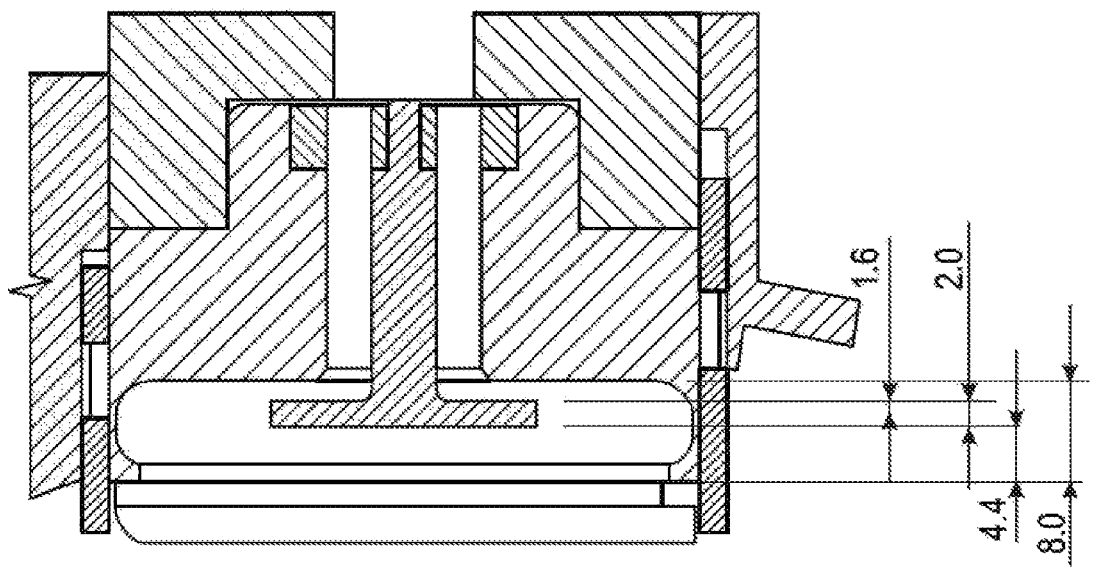
FIG. 19 shows schematic views of the airflow passage and flow disrupter.
Figure 19:
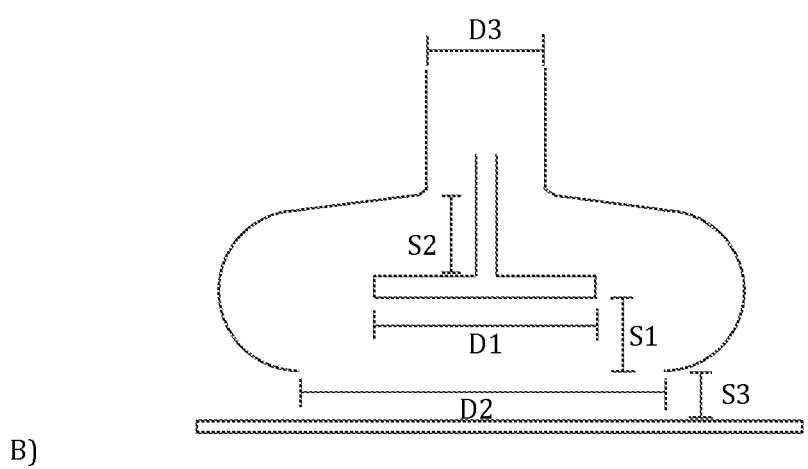
Figure 20:
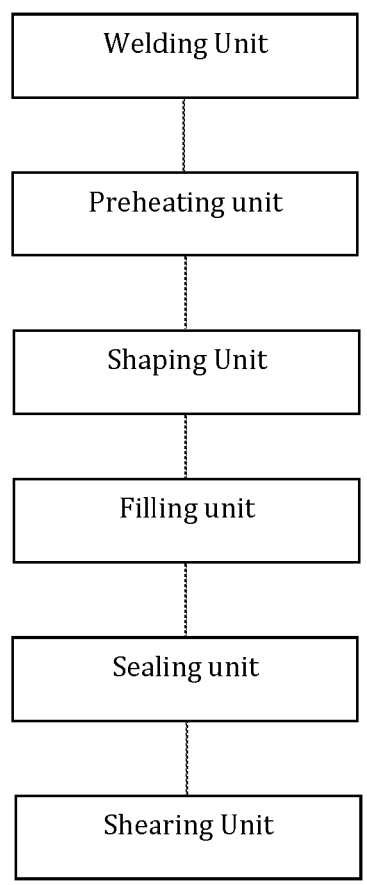
FIG. 20 shows a block diagram of the manufacturing system according to the invention.

The outlet 18 of the lower section 24 has a greater diameter D2 than the diameter D3 of the inlet 18 and output end 72 of the upper sections of the airflow passages 14. Referring to FIGS. 6 and 19 the lower section 24 can have substantially concave shaped side walls. The top walls of the lower section are angled from the output end of the upper section to the top of the concaved side walls. The lower edge of the concaved side walls leads to the opening defining the outlet 18 of the lower section 24 and airflow passage 14.

The outlet of the airflow passages are configured to be sized and shaped to substantially compliment the shape and size of the internal dimensions of the supporting rings which are welded to the underside of the sheet of fabric and define the selected area to be heated and subsequently formed into the body of the capsule. The outlet of the airflow passages will have a substantially circular cross section, substantially corresponding to the internal dimensions of the size of the annular support rings used in the beverage capsules.

In one embodiment the outlet opening has a diameter D2 of about 35-45 mm, preferably about 38-42 mm, preferably about 39 mm. The diameter D3 of the output is about 7-15 mm, preferably about 9-12 mm, preferably about 12 mm.

Figure 3:
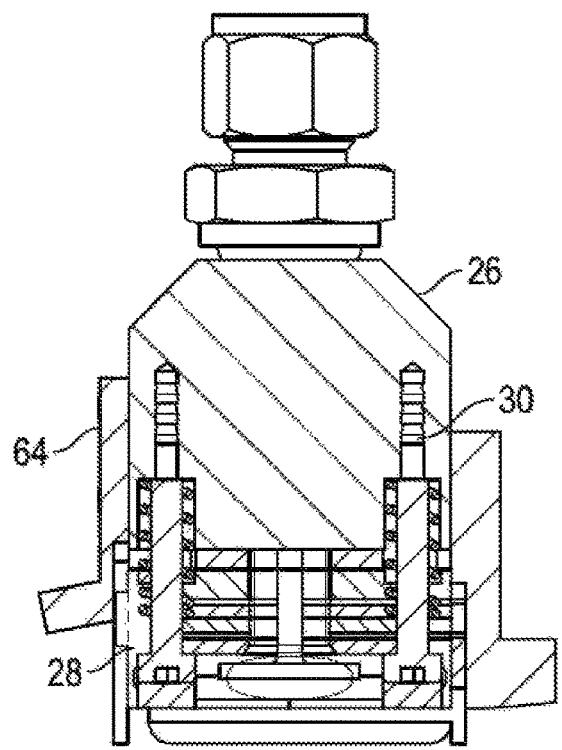
FIG. 3 is a sectional view of the heating apparatus.
Figure 5:
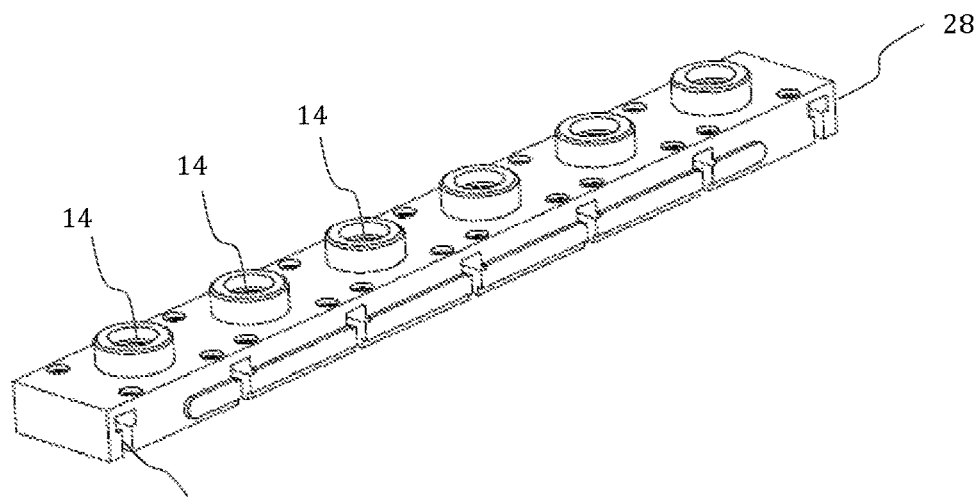
FIG. 5 is a top perspective view of the second component of the housing forming the apparatus.
Figure 7:
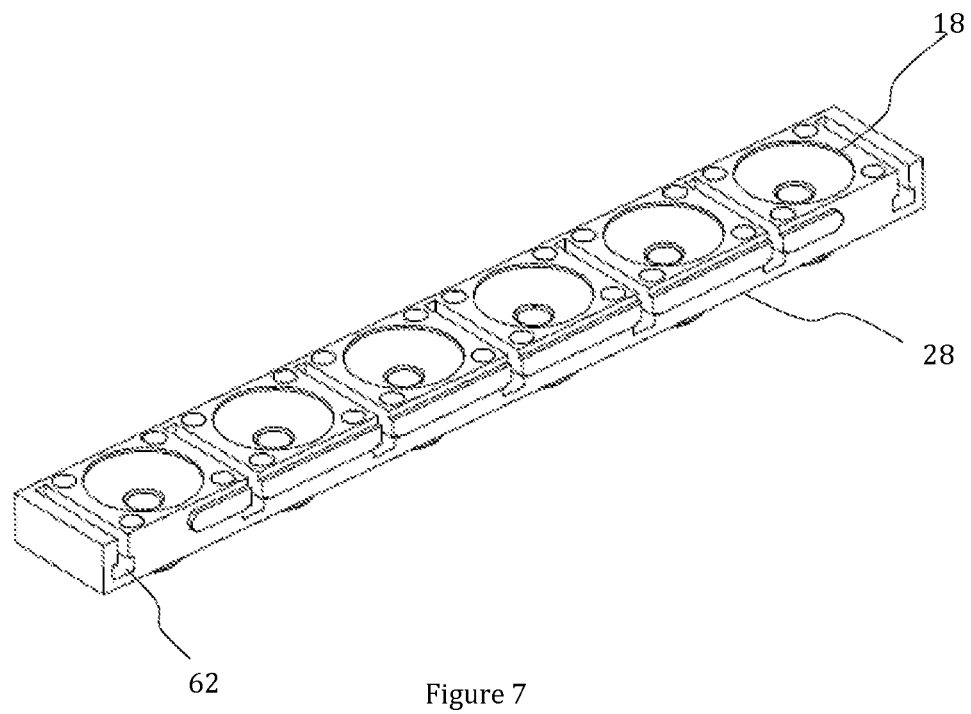
FIG. 7 is a bottom perspective view of the second component of the housing forming the apparatus.
Figure 8:
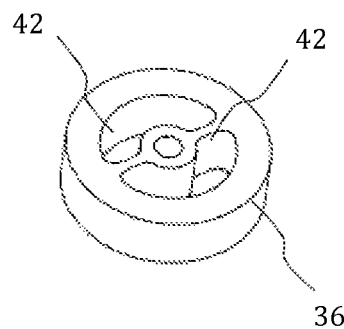
FIG. 8 is a view of the top plate of the flow disrupter.

In one embodiment as shown in the FIGS. 3, 5 and 7 the housing is comprised of a first top component 26 which defines the top portions of the upper sections 20 of the airflow passages 14, and a second bottom component 28 which defines the output ends 72 of the upper sections and the lower sections 24 of the airflow passages 14. The first and second components are connected together with a plurality of connecting members 30 that extend through the first and second components to retain the two components together, as shown in FIG. 3. In an alternative embodiment the first and second components can be formed integral with each other.

Figure 16:
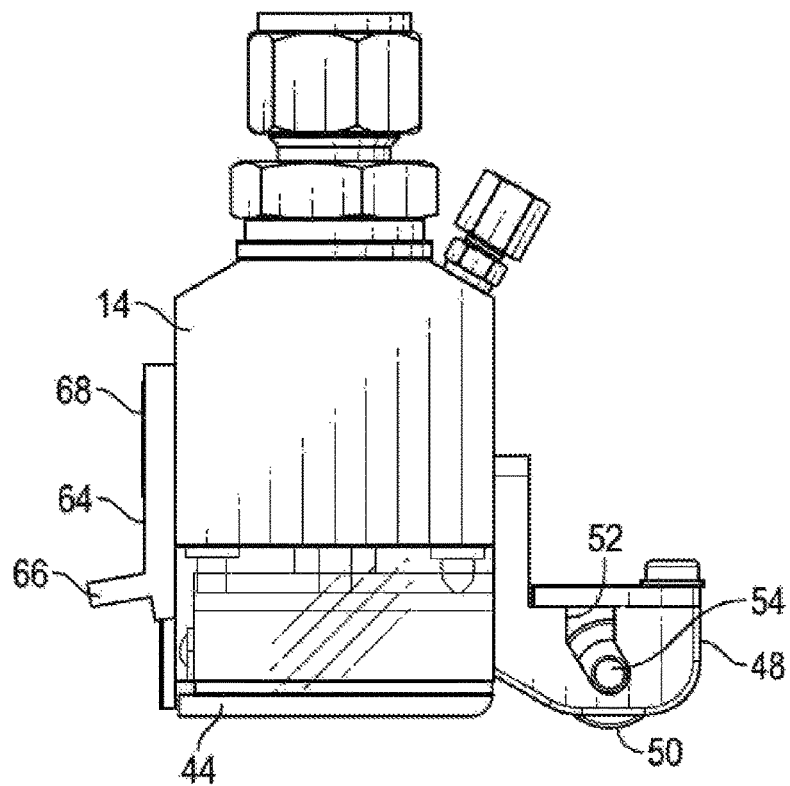
FIG. 16 shows a side view of the apparatus.

In the embodiments exemplified in the FIGS. 1, 2 and 16 each airflow passage extends through the housing, such that each individual passage is connected to an external air supply. In an alternative arrangement the housing may have a single input opening having an airflow connecting member, in the first component to receive heated air from the external air supply. The input opening is connected to an input manifold in communication with each of the individual airflow passages.

An airflow disrupter 34 is located within each airflow passage 14 configured to direct the air from the centre of the airflow stream, when the heated air enters the lower section 24, towards the sides of the lower section 24 of the airflow passage. The flow disruptor is present to disrupt the flow of air in the airflow passage and help provide a substantially uniform temperature distribution across the outlet 18 of the airflow passage. The presence of the flow disrupter enables the same amount of heat to be applied across the entire defined area on the fabric.

Figure 9:
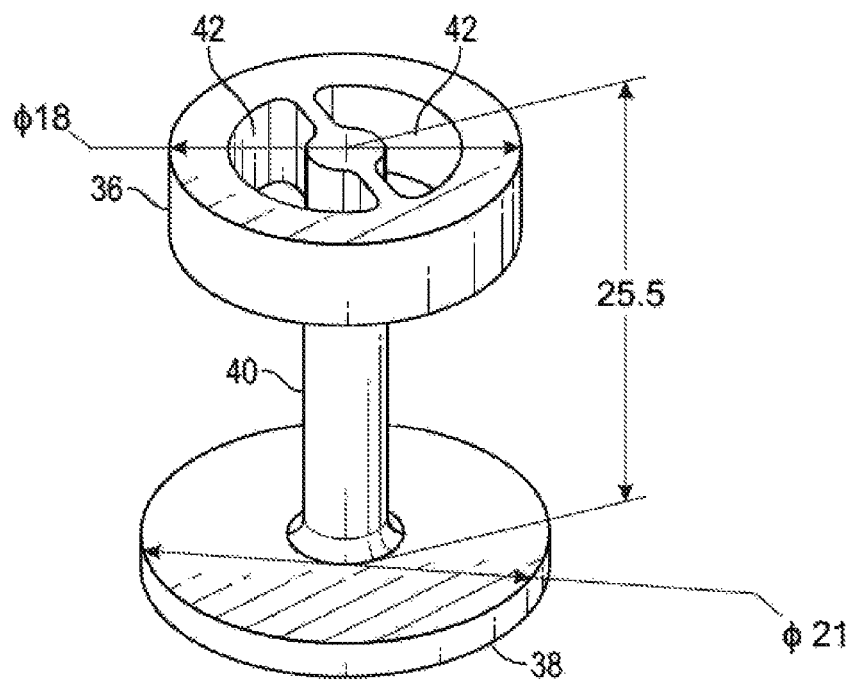
FIG. 9 is a view of the flow disrupter.

Referring to FIG. 9, the airflow disruptor 34 comprises a lower first plate 38 and a upper second plate 36 connected thereto by a shaft 40. The lower plate is a substantially circular shaped solid plate, which diffuses the air in the lower section of the airflow passage. The upper plate 36 supports the flow disrupter in the airflow passage 14. The upper plate has a substantially circular shaped and comprises two circumferentially spaced arcuate slots 42 about its central axis. The diameter D1 of the lower plate 38 is greater than the diameter of the upper plate. The diameter D1 of the lower plate is smaller than the diameter D2 of the outlet of the airflow passage and larger than the diameter D3 of the output end of the upper section.

The ratio of the diameter D2 of the outlet of the airflow passage to the diameter D1 of the plate is in the range of about 4:1 to about 1.5:1, preferably about 3:1 to 2:1, preferably about 2:1. The ratio of the diameter D3 of the output end of the upper section to the diameter D1 of the plate is in the range of about 1:5 to 1:1.5, preferably about 1:3 to 1:2, preferably about 1:2.5.

In one embodiment the outlet has an opening having a diameter D2 of about 35-45 mm, preferably about 38-42 mm, preferably about 39 mm. The diameter D3 of the output is about 7-15 mm, preferably about 9-12 mm, preferably about 12 mm. The lower plate can have a diameter D1 of about 16-25 mm, preferably about 18-23 mm, preferably about 21 mm.

The flow disruptor 10 is located entirely within the airflow passage 14 and positioned such that the lower plate 38 is located in the lower section 24 of the airflow passage. The shaft 40 of the airflow disrupter extends through the output end 72 of the upper section 20 such that lower plate 38 is positioned in the lower section 24 of the airflow passage above the outlet 18.

The length of the shaft is such that there is a space S1 between the bottom surface of the lower plate 38 and the outlet 18 of the airflow passage, such that in use the plate will not contact the sheet of material. The airflow disrupter is also positioned so that there is a space S2 between the top surface of the lower plate 38 and the output end 72 of the upper section 20 to provide a gap for the airflow to move towards the side walls of the lower section 24. Preferably the space S2 between the top of the plate 38 and the output end 72 is about 1-5 mm, preferably about 1-3 mm, preferably about 1-2 mm, preferably about 1.6 mm. Preferably the space S1 between the bottom of the plate 38 and the outlet 18 is about 3-6 mm, preferably about 3-5 mm, preferably about 4 mm.

The upper plate 36 is located in the enlarged portion 22 of the upper section 20, such that it sits on the groove provided circumferentially about the central section of the upper section 20. The groove provides an enlarged diameter region in a central section of the upper section 20 of the airflow passage 14. The enlarged diameter substantially corresponds to the diameter of the upper plate. The upper plate and groove and assists in retaining the flow disrupter in the airflow passage.

Whilst the airflow disrupter is exemplified as being supported in the airflow passage due to the presence of the top plate in the upper section of the airflow passages and groove, other means to support the lower plate in the airflow passage, for example radially extending support arms from the top end of the shaft. Furthermore other means can be used to disrupt the airflow in the airflow passage, to provide a diffused airflow at the outlet of the airflow passage.

The airflow disruptor is constructed of a heat conducting material, such as brass, peek, stainless steel, etc. When a heat conducting material is used to form the flow disruptor, it will be understood that as well as the hot air directly heating the sheet of material the bottom surface of the lower plate will also provide heat to the sheet of material via a radiative effect. However other materials can be used to form the airflow disruptor, including non-heat conducting materials.

During operation, heated air flows from the external air source into the airflow passages 14 of the apparatus 10, as the heated air flows down the passages the heated air will flow though the apertures 42 in the upper plate 36 of the airflow disruptor 34. Without being bound by theory, the air exiting the upper section 20 of the airflow passage 14 will hit the top surface of the lower plate 38 diverting the airflow out towards the sides of the lower section 24 of the airflow passage 14, creating turbulence in the lower section 24 of the airflow passage thereby enhancing heat transfer in the air stream to effect a substantively uniform distribution of heat across the outlet of the passage.

This enables the predefined area of the fabric located under the apparatus to be heated to substantially the same temperature across the defined area. If no airflow disruptor was present the air would travel unimpeded down the airflow passage such that there would be a faster flow at the middle of the outlet of the airflow passage, resulting in an uneven temperature distribution across the outlet. This would result in different parts of the defined area being heated to different temperatures. For example less heat would be applied to the fabric at the edges of the defined area, compared to the fabric at the centre of the defined area. In addition non-woven fabric are not necessarily uniform in terms of density, there can be 5-10% variability in density across the fabric. However the present apparatus is still able to heat the fabric to a uniform temperature across the defined areas.

The apparatus further comprises airflow barriers to provide at least a partially enclosed chamber around the outlet of each airflow passage. By partially enclosed chamber it is meant that there is at least one gap in the walls defining the chamber which extend down below the bottom surface of the housing on one side, for example no airflow barrier that defines one of the walls of the chamber is present about one side of the outlet. Preferably a gap is provided in the front side of the chamber such that at least the front side of the outlet is open, providing an opening for the heated air to be exhausted, i.e. there is no airflow barrier on the front side of the housing extending down below the bottom surface of the housing. The opening may be configured to direct the exhausted air in a predetermined direction, such as downstream of the heating apparatus (e.g. towards a direction suitable for connecting a thermoforming station). It will be appreciated that directing the exhausted air in this manner may be useful for making efficient use of heat.

The apparatus comprises different forms of airflow barriers providing the walls defining the chamber. A first form of airflow barrier defines the walls of the chamber to the sides of the outlets, between adjacent airflow passages. A second form of airflow barrier defines walls of the chamber to the front and/or back of the outlet of the airflow passages.

FIG. 2 shows airflow barriers 44, in the form of side partitions which are located to the side of the outlets between adjacent airflow passages 14, and which extend transversely across the width of the housing 12. These side partitions 44 extend downwardly from the bottom of the housing 12 and help constrain the heated air to the defined area on the sheet of fabric and prevent air expelled from one airflow passage mixing with flow from adjacent airflow passages. The side partitions are located between adjacent airflow passages and on the outer sides of the airflow passages located at the end of the housing.

Figure 10:
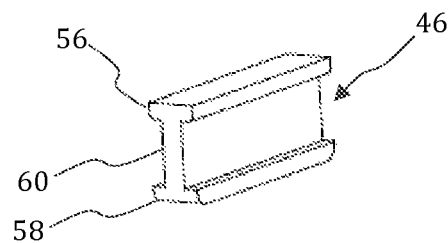
FIG. 10 shows a side partition of the apparatus.

As shown in FIG. 10 the side partitions 44 have a substantially I-shaped cross section, defined by a pair of horizontally extending flanges 56, 58 spaced apart by a central vertical connecting portion 60. The top flange 56 retains the partition in the housing. The top flanges 56 of each partition 44 are located within T shaped channels 62 formed in the bottom of the housing 12. The T-shaped channels 62 extend transversely across the width of the bottom surface of the housing 12, and have an open end and a closed end. The bottom flange 58 contacts the material in use. The central portion 60 has a height such that in use the outlet does not contact the material itself, and there is a space S3 provided between the bottom of the housing 12 and the fabric.

The partitions are moveable up and down relative to the housing. In one embodiment they have a vertical movement relative to the housing of approximately 1-5 mm. The T shaped channels are configured to allow vertical movement of the side partitions. The side partitions are moveable to account for the non-circular drums and/or tolerance of variability in thickness of the material which is to form the body of a capsule which can be used to move the fabric.

The side partitions are formed from materials having a low co-efficient of friction (e.g. less than about 0.3, preferably less than about 0.2, preferably less than about 0.1), preferably non-heat conducting materials, such as Teflon® (PTFE).

Figure 11:
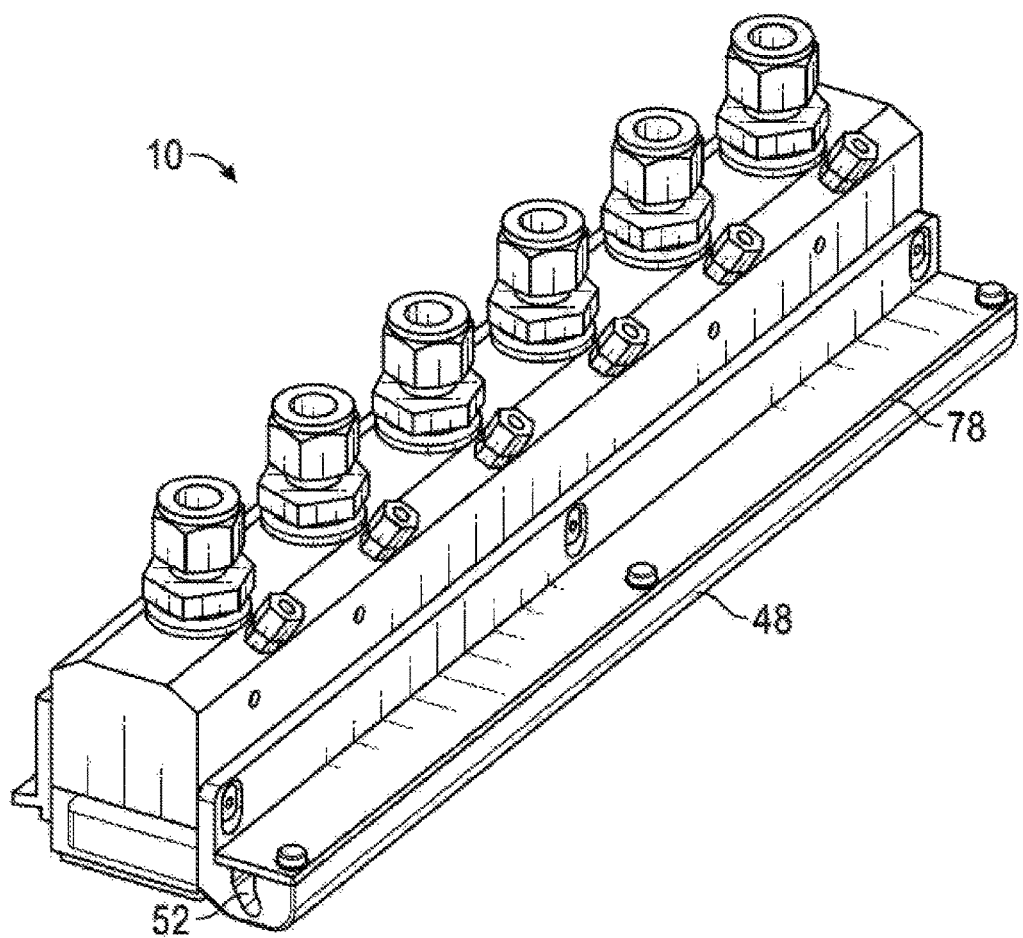
FIG. 11 shows a front perspective view of the apparatus.
Figure 12:
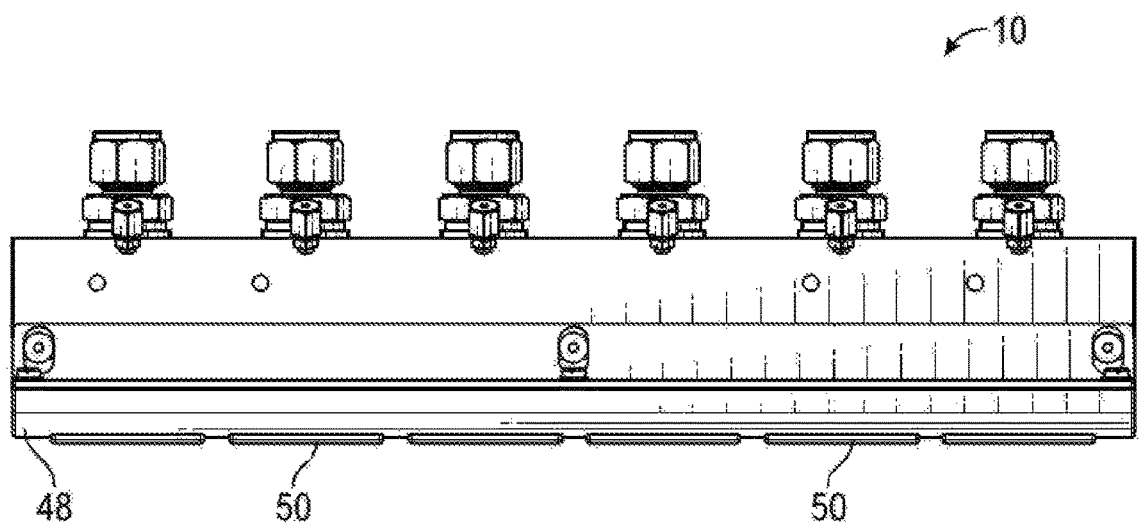
FIG. 12 shows a front view of the apparatus.
Figure 13:
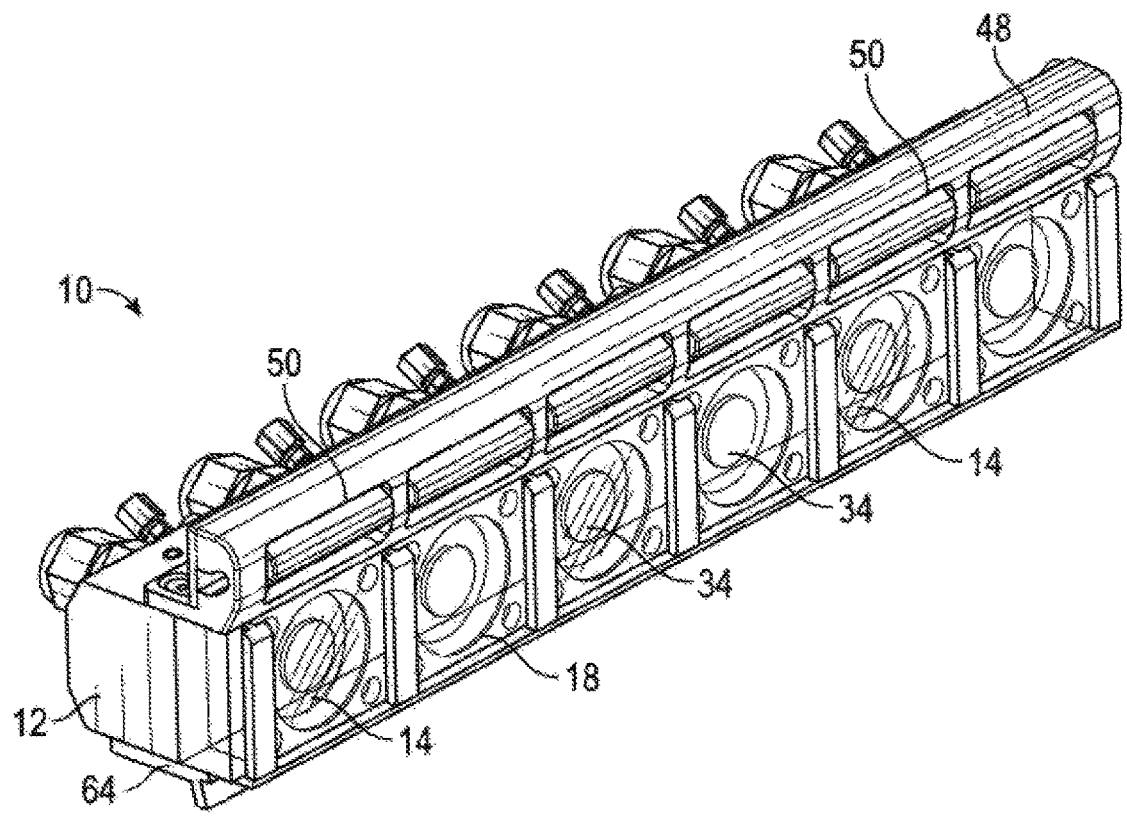
FIG. 13 shows a bottom perspective view of the apparatus.
Figure 14:
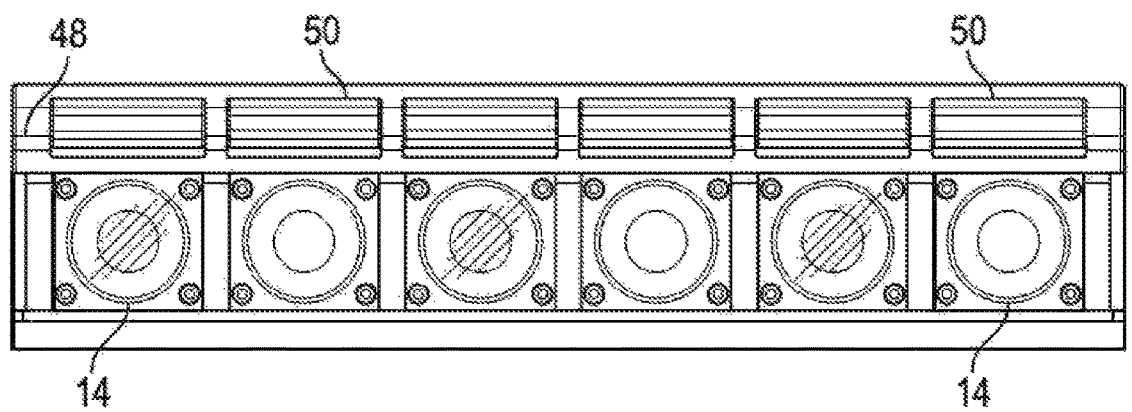
FIG. 14 shows a bottom view of the apparatus.
Figure 15:
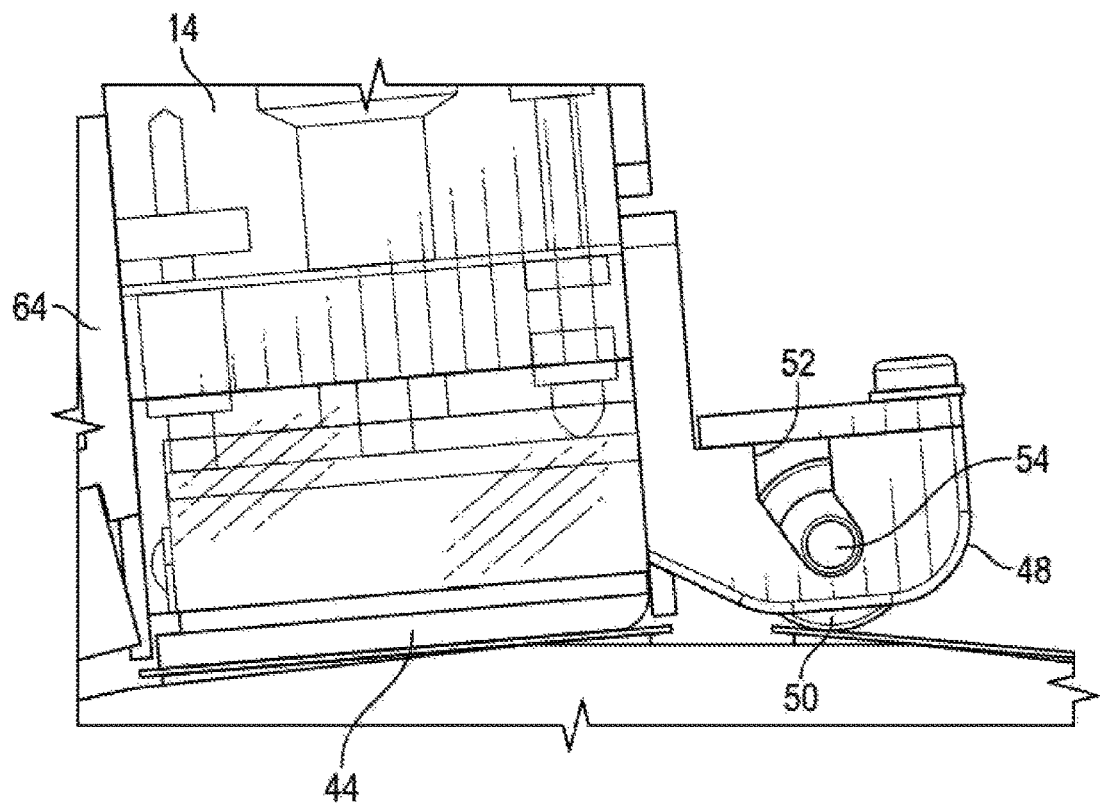
FIG. 15 shows an enlarged partial side view of the apparatus.

FIGS. 11, 15 and 16 shows airflow barriers, in the form of front and back skirts 46 which extend longitudinally across the front and back of the housing 12. The front and back skirts 46, are attached to the front and back walls of the housing, respectively such that they extend downwardly below the bottom of the housing 12. The skirts 46 are connected to the housing by attachment means (not shown), and have a height such that, when connected to the housing the bottom edge of the skirt 46 extends below the bottom of the housing 12. The front and back skirts are formed from non-heat conducting material such as silicone rubber. However other suitable materials can also be used. The skirts help constrain the heated air to the defined area on the sheet of fabric and prevent air expelled from the one airflow passages to be exhausted to adjacent units used in the manufacturing process.

When formed from non-heating conducting materials the airflow barriers also acts as heat barriers, to assist in preventing heat dissipating to adjacent defined areas of the material and to other units in the system, where further heat may not be required.

Although FIGS. 11, 15 and 16, shows both front and back skirts being present, providing together with the side partitions, an enclosed chamber about the outlet passage. In one embodiment only a back skirt is present. When the front skirt is not present, the back skirt and two opposing side partitions provide a partially enclosed chamber having an opening towards the front of the housing to allow air to be exhausted forward towards the next unit in the system, the thermoforming unit. This helps the fabric maintain its temperature as it moves to the next unit to be further processed.

The apparatus also comprises a roller mechanism as shown in FIGS. 11-14 attached to the back of the housing. The roller mechanism comprises a roller body 48 including a plurality of rollers 50 attached to the back of the housing 12. The rollers are moveable up and down relative to the housing to take into account the shape of the drum on which the fabric is conveyed on. The body can comprise elongate slots 52 extending at an angle away from the horizontal in which the shafts 54 of the rollers 50 can be located and enable the rollers 50 to move up and down relative to the housing, in addition to rotating about their central horizontal axis. A cover 78 extends across the top of the rollers 50 and roller body 48 to partially enclose the rollers in the body 48. The number of rollers corresponds to the number of airflow passageways.

The rollers contact the fabric in use and helps keep the fabric from lifting up, maintaining the fabric in the desired position. The rollers can also act as a further airflow barrier. The rollers can help prevent heated air expelled from the apparatus from leaking out beyond the back of the apparatus and to the adjacent units used to manufacture the beverage capsules. For example, the rollers help prevent heat reaching the welding unit that would be located behind the heating unit.

The rollers can be used with or without the skirt airflow barriers. In the absence of the skirts, the rollers define the back wall of a partially enclosed chamber surrounding each outlet, with opposing side partitions defining the sides, to provide an open front end from which the heated air can be exhausted. As discussed above the absence of an airflow barrier at the front of the housing allows air to be exhausted forward towards the next unit in the system, the thermoforming unit. This helps the fabric maintain its temperature as it moves to the next unit to be further processed.

The rollers of the heating constraining members are formed from materials having a low co-efficient of friction, preferably non-heat conducting materials such as Teflon® (PTFE). However other suitable non-heat conducting materials can be used.

Figure 17:
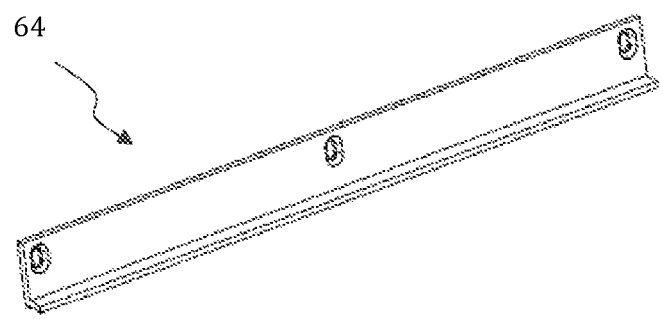
FIG. 17 shows a locating member for use with the apparatus.

The apparatus further comprises a locating member 64 to position the apparatus, in use such that the apparatus will be positioned at the desired height above the fabric. As shown in FIGS. 16 and 17 the locating member 64 has a substantially L shaped cross section and is attached to the back side of the housing 12. The L shaped locating member extends along the front of housing, with arm 66 of the locating member extending out from vertical extending portion 68 which is connected to the front side of the housing 12 by connecting members (not shown). The locating member helps in locating the apparatus to the correct position relative to the sheet of material. In addition the outwardly extending arm 66 of the locating member 64, also assist in directing heated air from the airflow passage towards the thermoforming station. This helps in the fabric maintaining its temperature at the thermoforming station.

Figure 18:
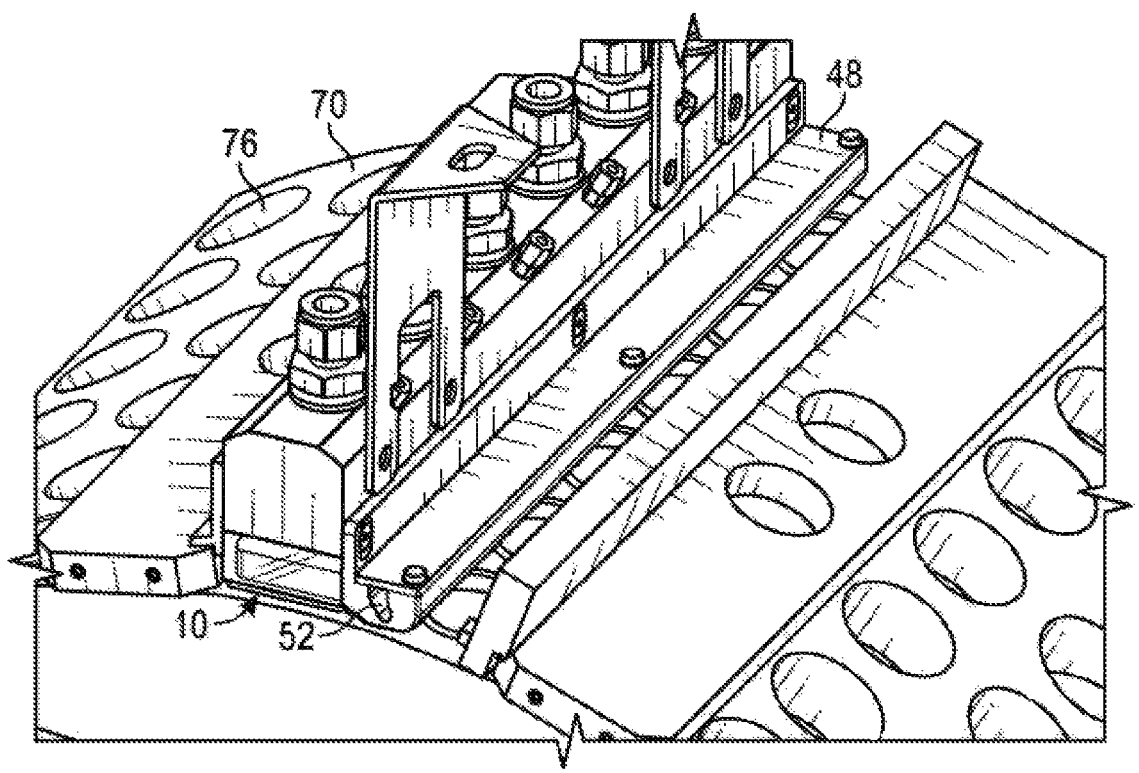
FIG. 18 shows a perspective top view of the apparatus and drum.

A machine for the producing the coffee capsules includes a plurality of units for producing the capsules from a sheet of biodegradable non-woven fabric formed from a polymeric blend and for moving the sheet of fabric through the machine. Referring to FIG. 18, the units include a welding unit for attaching the support rings to the sheet of fabric, a preheating unit for heating the fabric, a shaping unit to shape the fabric into the body of the capsule, a filling unit to provide the body with a portion of ground coffee, a sealing unit to provide a closure or lid to the capsule, and a shearing unit to cut the formed capsules from the sheet of fabric to form individual coffee capsules. Conveyancing means move the sheet of fabric to each station of the system, so that the fabric can be processed accordingly by the relevant unit. Conveyancing means can include a conveyer belt and rotating drum.

In one embodiment a rotating drum 70 is provided with a plurality of cavities in the form of seats 76 for receiving the supporting rings and holding them in a spaced apart arrangement as they move through the system. The seats 76 are arranged into rows, each row parallel to the axis of rotation of the drum. Other transporting devices can be used to move the fabric and support rings through the system, for example a carousel provided with a plurality of seats could be provided instead of a drum.

In one embodiment the machine may also comprise a vacuum unit connected to the drum. The vacuum unit can comprise a vacuum pump to supply air suction to the drum area to remove excess heat away from the drum. Preferably air suction is provided under the heated sheet of material below the pre-heating unit.

The preheating unit can comprise a heating apparatus as described above comprising a housing for receiving a supply of heated air and a plurality of airflow passages for directing the heated air to the desired locations on the sheet of fabric.

The conveyancing means, the welding unit, the filling unit, the shaping unit, the sealing unit and the shearing unit can be standards units known in the industry and used in the production of beverage capsule, for example those machine provided by ICA Spa (Italy). The shaping unit can be a standard thermoforming unit known in the industry, for example that provided by ICA Spa (Italy). The vacuum unit can be a standard unit known in the industry to draw warm air away from an area.

In order to produce the coffee capsules from a biodegradable fabric the following steps are undertaken:
- providing a sheet of fabric, which is used to form the body of the capsule;
- welding a plurality of supporting rings to the sheet of fabric, the rings providing defined areas on the fabric;
- preheating the defined areas on the sheet of the fabric, the area to be heated being the portion of fabric which is to the form the body of the capsule;
- shaping the fabric in the heated defined area to form the body of the capsule;
- filling the body of the capsule with ground coffee;
- providing a lid to the top of the body of the capsule to enclose the coffee in the capsule; and shearing the fabric to provide individual beverage capsules.

The fabric used to form the body of the capsule and supporting rings are attached together as is known in the industry. A continuous supply of a sheet of non-woven fabric comprising a blend of polymers and support rings are provided to the machine. The supporting rings are provided into spaced apart channels, to be loaded into individual seats on a rotating drum to provide an array of supporting rings. In the exemplified embodiment there are six channels, such that each row across the drum 70 will have six seats 76 to hold their respective supporting rings, such that rows of six supporting rings are provided on the sheet of the fabric. The fabric is provided across the channels and the rings and fabric are moved to the welding station where heat is applied by the welding unit to the fabric located above a row of rings. The application of heat attaches the supporting rings onto the underside of the fabric. The drum is rotated to move the fabric with the welded rings to the preheating station, and another row of rings is moved to welding station.

At the preheating station, the preheating apparatus is positioned above a row supporting rings attached to the fabric. The heating apparatus comes into contact with the fabric and rapidly provides a heated air stream to the fabric before the fabric is moved on to the next station, to have the fabric formed into the capsule body. The next row of supporting rings attached to the fabric is then moved into the heating unit.

The air applied to the fabric by each airflow passage is contained to the area immediately about the outlets by the airflow barriers. The shape and configuration of the elements of the heating apparatus assist in focusing the air to the defined areas, and providing a uniform heat distribution across the desired area.

At the preheating station heated air is delivered to the apparatus at a temperature in the range of about 75° C. to 170° C., preferably in the range of about 90° C. to 155° C., preferably about 140° C. to 150° C., at an airflow rate of about 3-12 ft$^3$/minute, preferably about 6-9 ft$^3$/minute, preferably about 7-9 ft$^3$/minute, preferably about 8 ft$^3$/minute (0.0038 m$^3$/s) through the airflow passage by conventional hot air heaters. The outgoing airflow at the outlet airflow passage can have a temperature in the range of about 75° C. to 170° C., preferably in the range of about 90° C. to 155° C., preferably about 140° C. to 150° C. The biodegradable non-woven fabric located underneath the apparatus is brought up to a temperature in the range of about 75° C. to 140° C., preferably in the range of about 90° C. to 130° C., preferably about 90° C. to 120° C. from room temperature in less than 1 second, by the heated airflow.

During heating, sensors can monitor the temperature and flow rate of the airflow through the airflow passages. A control mechanism can feed back to the external air supply to control the operating conditions such as the temperature of the ingoing airflow and the flow rate, to provide the required outgoing airflow temperature such that the fabric is heated to the required temperature.

This results in a large amount of heat being applied to the fabric quickly under controlled condition, allowing the fabric to be heated but not to melt. Once the defined areas of fabric have been heated the fabric can be moved quickly to the shaping unit to be formed into the body of the capsule, so that the fabric retain its heat as it moves from the preheating station to the thermoforming station.

Preheating the biodegradable fabric, on a lane by lane basis means the heating can be done quickly under controlled conditions, so that the biodegradable fabric will not melt or degrade. The shape and configuration of the apparatus, for example the use of individual nozzles to deliver the air to the individual defined areas, and the presences of the airflow barriers assist in containing the expelled air to the fabric for each individual capsule, and reducing interference from adjacent airflows. The heating of the material is performed as a separate step from the shaping of the fabric into the body of the capsule, and at a different location, such that the fabric is heated before being shaped into the desired form for the body.

The method can also comprise removing excess heat generated during pre-heating of the sheet of fabric. Excess heat generated by the pre-heating unit can be removed by a vacuum pump, providing air suction to draw the hot air away from the drum and fabric.

After preheating of the fabric, the drum is then rotated, so as to move the now heated fabric to the shaping station to form the fabric into the body of the capsule. In one embodiment during the shaping procedure a heated male thermoform moves downwards coming into contact with the preheated material inside the rings to provide a dome shaped cavity for the body of the capsule. The thermoform stretches the fabric into the shape of the dome. The seats in the drum provide a respective die to the thermoformer to assist in forming the desired shape of the body. Once the fabric is thermoformed, the thermoformers retract and the material cools and sets in its desired shape.

Thermoforming is a slow process, however the cycle time for conventional beverage capsule production systems are low, for example 35 cycles per minute, such that there is less than two seconds for the thermoforming unit to heat and shape the fabric. Therefore using conventional methods and apparatus not enough heat can be applied to the fabric in the time available due the thermoforming process. Preheating the material before the fabric is thermoformed, means the fabric can reach the required temperature for thermoforming, in the time available, without slowing the production time. The thermoforming conditions therefore become less critical as the fabric is already heated, by the time it reaches this stage of the production process.

The temperature in which the fabric is required to be heated in the pre heating step and for thermoforming, will depend on the fabric being used. It is preferred that the fabric is preheated to a temperature above its glass transition temperature and below its melting temperature.

After thermoforming the drum is further rotated to subsequent stations of the system where ground coffee is added to the body of the capsule, a lid to the capsule to retain the product inside the capsules is provided, and individual capsules are cut from the from the sheet of fabric, by conventional means. Providing the lid to the capsule and cutting the capsules may be performed substantially simultaneously.

A vacuum is applied to the drum to retain the capsules to the drum, before the fabric is cut around the outer edge of the support rings to provide the individual capsules. When the fabric is cut the vacuum is released so as to release the individual capsules from drum ready to be used in a brewing machine. The individual capsules can be released from the drum to be deposited onto a horizontal conveyor belt (or other conveyancing means) to be moved to a packaging station for packaging, e.g. multiple capsules into a box or bag.

A vacuum can also be applied to the drum to remove excess heat away from the drum. This can help maintain the drum temperatures below the levels that might soften the support rings, particularly when the support rings are formed from a biodegradable material. Removing excess temperature can also prevent the drum machinery itself from increasing to levels, that would be uncomfortable for the operator.

Although the heating apparatus has been described as comprising a housing comprising multiple airflow passages to simultaneously provide heated air to multiple defined areas on the sheet of material, an apparatus according to the invention may comprising a housing have a single airflow passage connectable to an external heated air supply, to preheat a defined area on the sheet of material. A plurality of these housings comprising a single airflow passage can be used to together to provide a system that can preheat multiple defined areas on the sheet of material substantially simultaneously.

The invention has been described with reference to the production of coffee capsules, containing ground coffees. However the invention can also be used in the production of beverage capsules for other drinks, for example tea or hot chocolate, and other infusion beverages.

Furthermore, whilst the invention has been described for use in forming capsules from a non-woven fabric formed from a biodegradable blend of polymers, the methods and apparatus described can also used in manufacturing capsules formed from other biodegradable fabrics and other standard non-biodegradable materials. The material that is to be used to form the body of the capsule should be a material that once formed into the capsule body is suitable for use in coffee and/or tea brewing.

The invention claimed is:

1. A preheating apparatus for use in producing a beverage capsule comprising a body formed from a material, the apparatus comprising:
    a housing having a front a back and a bottom, the housing comprising a plurality of spaced apart airflow passages for receiving a supply of heated air, each airflow passage comprising:
    an inlet to receive the heated air from an air supply means;
    an outlet for discharging the heated air to a defined area on the material which is to form the body of a capsule; and
    an airflow disrupter supported within the airflow passage configured to disrupt the air flow through the airflow passage to provide a substantially uniform temperature distribution across the outlet such that the defined area can be substantially uniformly heated
        wherein the apparatus comprises airflow barriers disposed about the outlet of the airflow passage to contain the airflow, wherein the airflow barriers comprise a first form of airflow barriers, wherein the first form of airflow barriers are side partitions located between adjacent airflow passages, the side partitions extending downwardly from the bottom of the housing and moveable relative to the housing.

2. A preheating apparatus according to claim 1 wherein the airflow passage comprises a first section having the inlet and an output end leading to a second section having the outlet for discharging the heated air to the material, and wherein the flow disrupter is located in a lower section of the airflow passage.

3. A preheating apparatus according to claim 2 wherein the flow disrupter comprises a plate coaxially located in the second section of the airflow passage, the plate having a smaller diameter than the outlet of the airflow passage.

4. A preheating apparatus according to claim 3 wherein the ratio of the diameter of the outlet to the diameter of the plate is about 4:1 to about 1.5:1.

5. A preheating apparatus according to claim 3 wherein the ratio of the diameter of the output end of the first section to the diameter of the plate is about 1:5 to 1:1.5.

6. A preheating apparatus according to claim 3 wherein the flow disrupter further comprises a support member to support the flow disrupter in the airflow passage.

7. A preheating apparatus according to claim 6 wherein the support member is a second plate connected to the plate in the second section by a shaft, wherein the second plate comprises at least two apertures and supports the flow disrupter in the airflow passage.

8. A preheating apparatus according to claim 7 wherein the second plate has a smaller diameter than the plate in the second section.

9. A preheating apparatus according to claim 1, wherein the flow disruptor is formed from a heat-conducting material.

10. A preheating apparatus according to claim 1, wherein the side partitions have a substantially I shaped cross section.

11. A preheating apparatus according to claim 1, comprising a second form of airflow barriers, wherein the second form of airflow barrier comprises a back skirt extending along the back of the housing and/or a front skirt extending along the front of the housing, wherein the back skirt and the front skirt have a lower edge, and the lower edge of the front and/or back skirt extends downwardly below the bottom of the housing.

12. A preheating apparatus according to claim 1 further comprising a plurality of rollers attached to the back of the housing.

13. A preheating apparatus according to claim 12 wherein the rollers are vertically moveable relative to the housing.

14. A preheating apparatus according to claim 1 comprising a control mechanism to control an airflow rate and temperature of the air provided to the airflow passages.

15. A preheating apparatus according to claim 1 comprising sensors to measure an airflow rate and/or temperature of the air in the airflow passages.

16. A preheating apparatus according to claim 4 wherein the ratio of the diameter of the outlet to the diameter of the plate is about 3:1 to 2:1.

17. A preheating apparatus according to claim 16 wherein the ratio of the diameter of the outlet to the diameter of the plate is about 2:1.

18. A preheating apparatus according to claim 5 wherein the ratio of the diameter of the output end of the first section to the diameter of the plate is about 1:3 to 1:2.

19. A preheating apparatus according to claim 18 wherein the ratio of the diameter of the output end of the first section to the diameter of the plate is about 1:2.5.

* * * * *